(No Model.) 6 Sheets—Sheet 1.
W. H. AUSTIN.
MACHINE FOR MANUFACTURING LASTS FOR BOOTS OR SHOES.
No. 503,893. Patented Aug. 22, 1893.

WITNESSES.
E. M. Tuttle
Carrie E. Nichols.

INVENTOR.
William H. Austin
Per Edwin W. Brown
Attorney.

(No Model.) 6 Sheets—Sheet 2.

W. H. AUSTIN.
MACHINE FOR MANUFACTURING LASTS FOR BOOTS OR SHOES.

No. 503,893. Patented Aug. 22, 1893.

WITNESSES.
E. M. Tuttle
Carrie E. Nichols

INVENTOR.
William H. Austin
Per Edwin W. Brown
Attorney.

(No Model.) 6 Sheets—Sheet 3.
W. H. AUSTIN.
MACHINE FOR MANUFACTURING LASTS FOR BOOTS OR SHOES.
No. 503,893. Patented Aug. 22, 1893.

WITNESSES.
E. M. Tuttle
Carrie E. Nichols

INVENTOR.
William H. Austin
Per Edwin W. Brown
Attorney.

(No Model.) 6 Sheets—Sheet 4.
W. H. AUSTIN.
MACHINE FOR MANUFACTURING LASTS FOR BOOTS OR SHOES.
No. 503,893. Patented Aug. 22, 1893.

WITNESSES.  
INVENTOR.

(No Model.) 6 Sheets—Sheet 5.

W. H. AUSTIN.
MACHINE FOR MANUFACTURING LASTS FOR BOOTS OR SHOES.

No. 503,893. Patented Aug. 22, 1893.

WITNESSES.
E. M. Tuttle
Carrie E. Nichols

INVENTOR.
William H. Austin.
Per Edwin W. Brown.
Attorney.

UNITED STATES PATENT OFFICE.

WILLIAM H. AUSTIN, OF BROCKTON, MASSACHUSETTS, ASSIGNOR TO HIMSELF, WILLIAM H. CARY, WILLIAM THOMPSON, AND AUGUSTUS A. DELANO, OF SAME PLACE.

MACHINE FOR MANUFACTURING LASTS FOR BOOTS OR SHOES.

SPECIFICATION forming part of Letters Patent No. 503,893, dated August 22, 1893.

Application filed February 2, 1892. Serial No. 420,080. (No model.)

*To all whom it may concern:*

Be it known that I, WILLIAM H. AUSTIN, of Brockton, in the county of Plymouth and State of Massachusetts, have invented certain new and useful Improvements in Machines for Manufacturing Lasts for Boots or Shoes, of which the following is a full, clear, and exact description.

In the manufacture of lasts for boots or shoes in a last machine there is left on each last at the heel and toe of the last as it is finished by the last machine, a stub or portion where the last is held in the lathe at each end, and this invention consists in a machine for cutting, trimming and finishing such portion or stub left by the last machine at the toe of the last, to the proper shape and outline, of parts constructed and arranged for operation all substantially as hereinafter fully described reference being had to the accompanying sheets of drawings in which—

Figure 1:
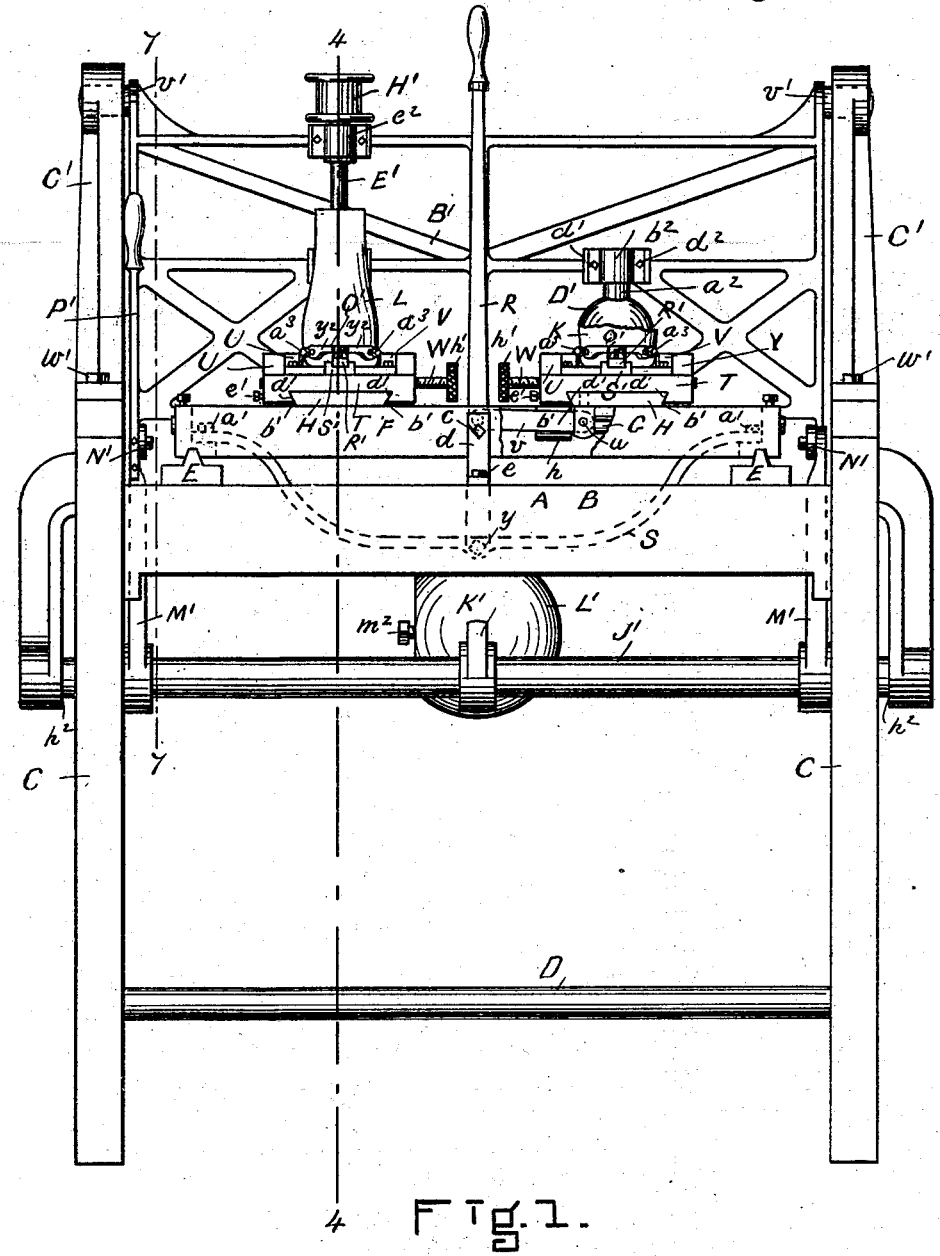
Figures 2, 10:
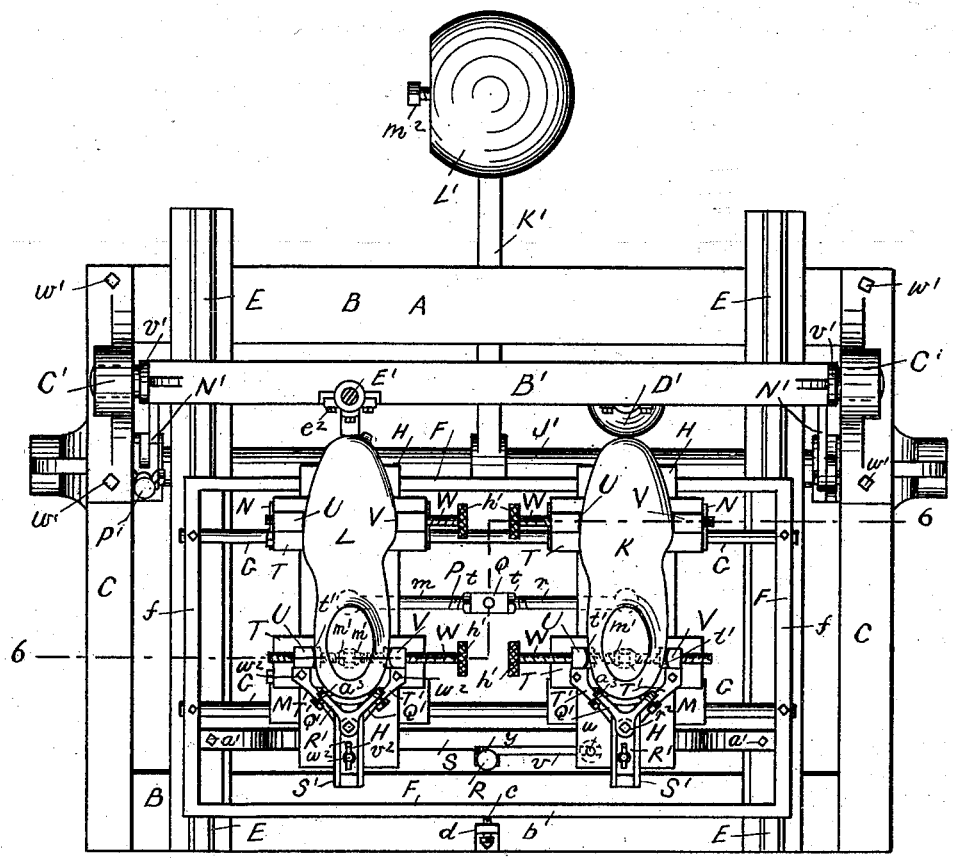
Figure 5:
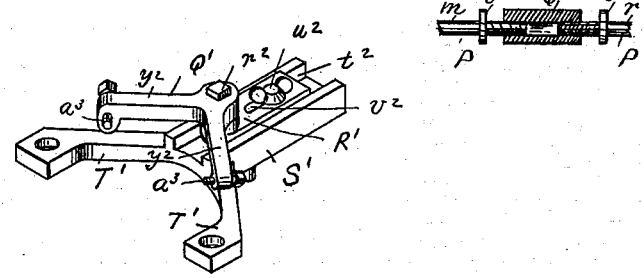
Figure 3:
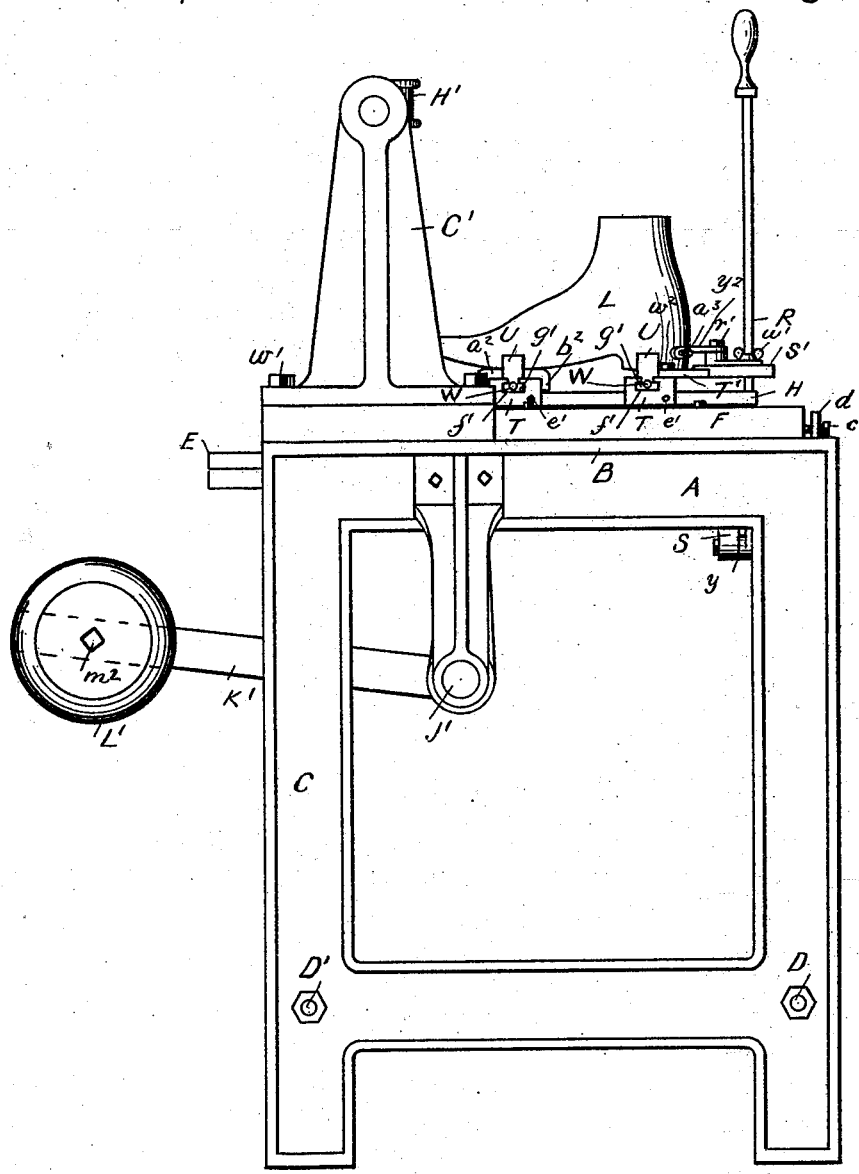
Figure 4:
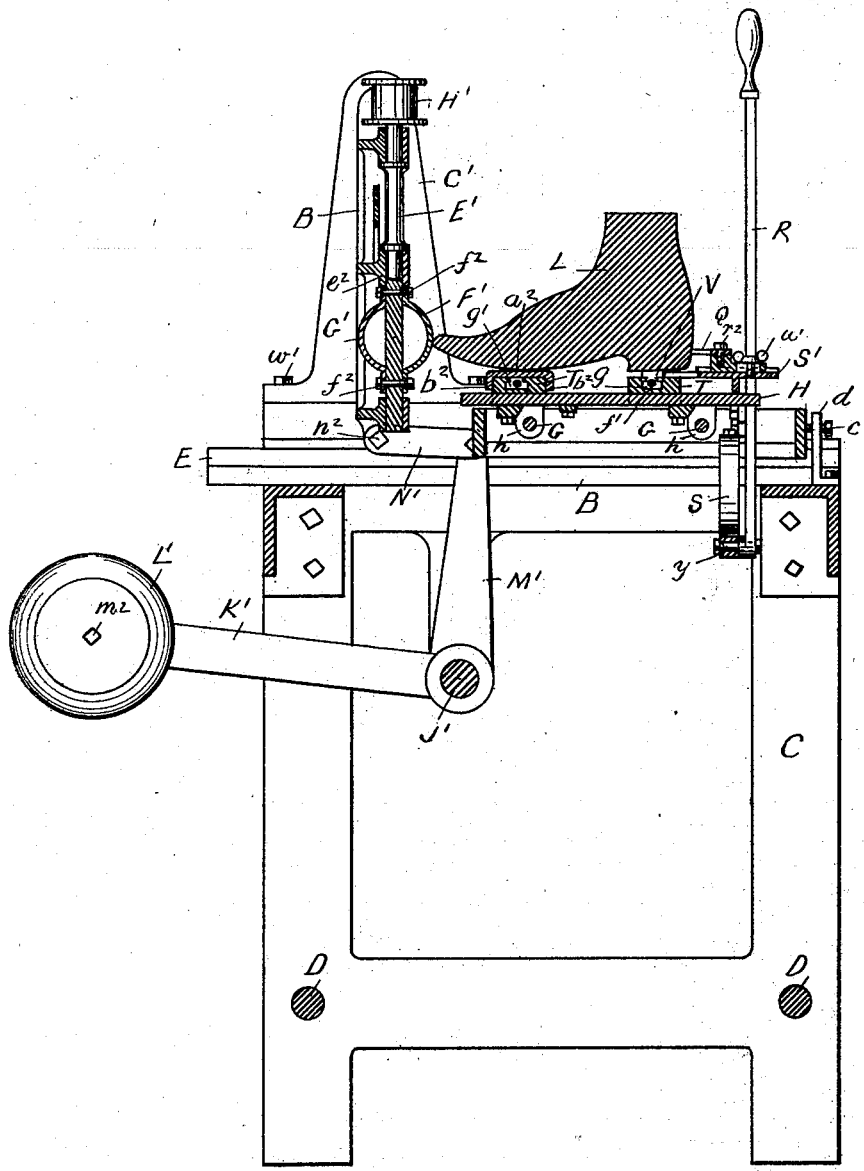
Figure 6:
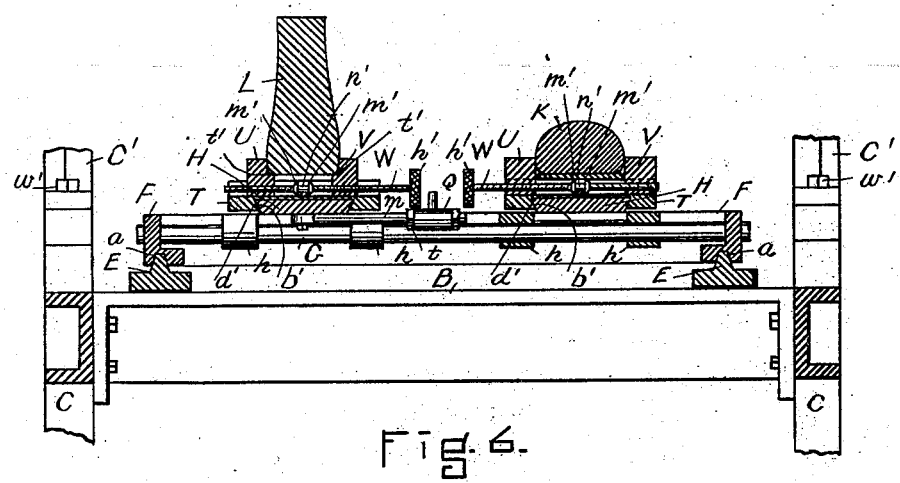
Figure 7:
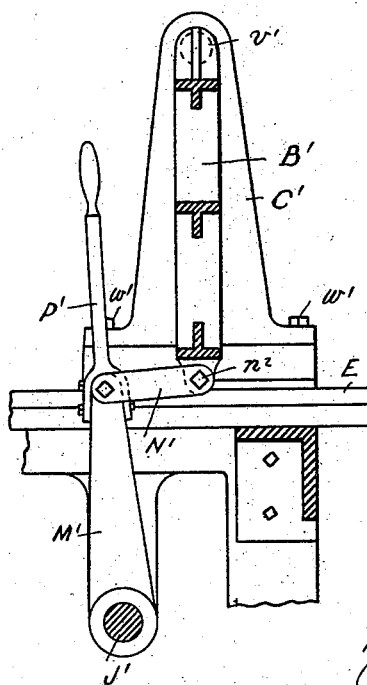
Figure 8:
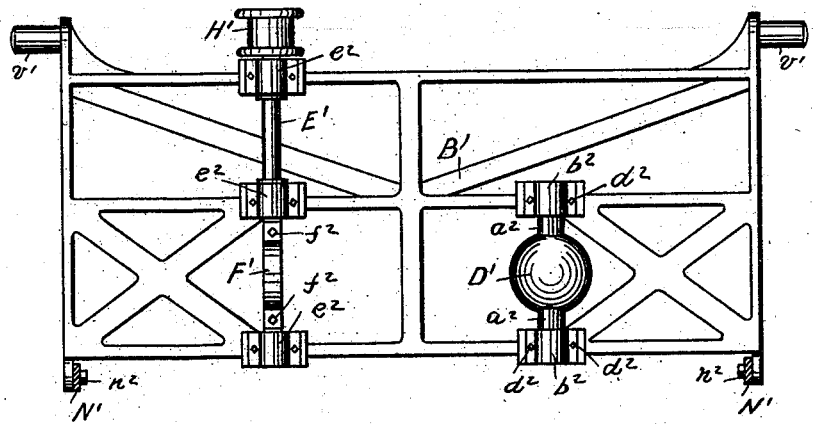
Figure 7:
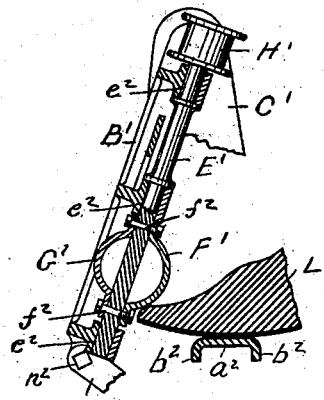

Figure 1, is a front view. Fig. 2, is a plan view. Fig. 3, is a side elevation. Fig. 4, is a vertical longitudinal section front to rear on line 4—4, Fig. 1. Fig. 5, is a detail perspective view of one of the parts. Fig. 6, is a vertical cross section on line 6—6, Fig. 2. Fig. 7, is a detail vertical section and elevation on line 7—7, looking to the left, Fig. 1. Fig. 8, is a front elevation of a portion of the machine. Fig. 9, is a detail vertical section. Fig. 10, is a detail section.

In the drawings A represents a framework composed of a bed piece B and side uprights C connected together near their lower ends by rods D.

Secured on the bed B are two transverse rails E extending from the front to the rear on which rails is adapted to slide back and forth by its under grooves $a$, a rectangular open frame F, its forward movement being limited by the abutment of its front bar $b$, against a horizontal screw $c$, in a lug $d$, secured by a screw $e$, to the front portion of the bed frame B.

G are two horizontal rods secured by their ends between and to the two end bars $f$, of the frame F, on which bars are arranged to slide back and forth transversely of the machine two plates H, which carry respectively the last pattern K and the last L, to be operated upon. Each of these plates H, rests on and is secured by screws to cross plates M, N, respectively, one at each end, having under lugs $h$, with transverse holes through them which pass freely over the rods G, so that the plates can freely slide or move back and forth along the rods from one end of the frame F, to the other. These plates are connected together by a rod P, made in two parts $m$, $r$, secured to the plates, the adjacent ends of which have right and left screw threads and have flanges $t$, between which flanges is a right and left screw threaded nut Q, screwing on to the two screw ends of the bar, the turning of which moves the two frames toward or from each other correspondingly.

On the under side of the pattern last support plate H, is pivoted at $u$, a link $v$, which at its other end is pivoted at $w$, to a lever R, pivoted at its lower end at $y$, to a bar or rod S, secured at $a'$ by its ends to the inside of the carriage frame F. Swinging this arm on its pivots to the right or left correspondingly moves the two supporting plates H, to the left or right they sliding along on their parallel supporting rods G. Each plate H, has its side edges under beveled as at $b'$ over which is a block T, having a dove tail groove $d'$ on its under side to fit the beveled edges of its plate H, which blocks are adapted to freely slide back and forth thereon and to be secured in place by set screws $e'$ screwing through the ends of the blocks T against the plate H. Each of these blocks T has a longitudinal T shaped groove $f'$ in its upper side in each of which grooves fits freely a correspondingly shaped rib $g'$ of two blocks U, V, adapted to slide back and forth and to and from each other in said groove the shape of which grooves prevents an upward displacement of the blocks U, V. Through each set of two of these blocks sliding on a transverse block extends horizontally a right and left screw rod W, having a head $h'$ for turning the same and which is prevented from longitudinal movement, by two flanges $m'$ of the rod embracing a lug $n'$ of the transverse block which lug fits freely over the portion of the rod between the flanges. Turning the screw rod in either direction correspondingly moves the two blocks to or from each other and each rear one has on its upper edge a shoulder $t'$ on and between which rests the last or last pattern by its heel, so that when the blocks are separated or opened from each other a sufficient distance the last or last pattern is placed in position and by then turning the screw rod W, in the proper direction the last or last pattern will be firmly secured in place.

A like means is used for the toe and heel of the last pattern and parts of which are marked by the same letters and the last pattern is secured in its place by like means of adjustment, the parts being lettered the same.

B' is a vertical frame pivoted at $v'$ to and between two uprights C' secured on top of the side uprights by screws $w'$ of the framework to swing forward and backward and located back of the carrying frame F.

D' is a guide of the shape of a ball or globe having diametrically opposite vertically projecting pinions $a^2$ which are disposed in vertical bearings $b^2$ secured to the swinging frame by screws $d^2$.

E' is a vertical shaft adapted to turn in bearings $e^2$ in the swinging frame and having secured to its lower part by screw bolts $f^2$, two cutters or knives F' G' each cutter being bent in the arc of a circle, one cutter F' of a diameter to have its cutting edge $g^2$ of the same diameter of the ball guide D', the other G' being a little less in diameter, the first one being the operating cutter and the other more as a balance to the operating cutter. On the upper part of this shaft is a pulley H' which is operated by a belt from any suitable driving pulley to cause the cutters to be revolved.

The ball guide D' and cutters are fixed on the swinging frame in the same horizontal and longitudinal vertical planes and their central vertical axial lines are intended to be the same distance apart as the central longitudinal lines of the two plates H, carrying the last pattern and last.

J' is a horizontal shaft adapted to rock or turn in bearings $h^2$ projecting down from each side upright C, having at its central portion an arm K' projecting backward therefrom which has a weight L' on its outer end secured in place by a set screw $m^2$. Secured to each end of this rock shaft are arms M' extending upward therefrom each having pivoted to its upper end a link N' which by its other end is pivoted at $n^2$ to the lower end of the swinging frame the one at the left having a handle P' for operation of the same, as shown in Figs. 2 and 7, more particularly. The weight L' acts to keep the frame forward in position for its cutter to operate on the last, and to move the frame back out of the way, take hold of the handle P' and pushing it backward the frame will be moved back.

In Figs. 2 and 5, more particularly, Fig. 5, being a detail view enlarged, is shown a guide or means for enabling the heel of the last and last pattern when placed in position on their supports to be centered laterally, to be secured laterally in place accurately and quickly and it consists of an angular arm piece Q' pivoted at $r^2$ to a bar R' disposed and adapted to freely slide back and forth in a groove $t^2$ in a supporting arm S' to adapt it to various lengths of lasts and last patterns and it is secured from movement by a thumb screw $u^2$ passing through a central longitudinal slot $v^2$ in arm R' and screwing into the plate S', which plate has two angular arms T' by which it is rigidly secured to the transverse block by a screw $w^2$ in each arm. In each end of the two arms $y^2$ of the angular arm Q' are screws $a^3$ which screw through the arms to project inwardly and against the inner ends of which screws bears the side of the heel of the last or last pattern, as shown more particularly in Fig. 2, in plan view.

The operation of the machine is as follows:—The swinging frame B' is swung back out of the way, the carrying frame F moved forward on its rails and the pattern last K and last L to be operated upon are placed on and between their respective supporting blocks T and secured firmly in place by their respective screws. The swinging frame is then swung forward into place, the cutters F' G' revolved by turning their shaft and then the carriage frame F is moved along its guiding rods G by operating the handle R to the right or left and then pushed backward upon its rails which brings the toe end of the pattern last and the last to be operated upon and at the right or left of the ball and cutters accordingly, in order to commence at the side of the toe, in operating upon it; the frame F is then moved along the rods to the right or left until the last pattern and last bear respectively upon the ball and cutters at the side of the toe and it is gradually pushed in such direction until the cutter has fully cut off the toe end of the last which is governed by the bearing of the ball guide on the last pattern, and then to cut more particularly upon the upper surface of the toe at the toe end the cutter frame is swung backward and upward and the last frame moved backward to bring the ball guide to bear upon the upper side of the toe end, which guides the cutter so that it cuts and trims off the upper side of the toe correspondingly to the shape and form of the toe of the last pattern; the swinging back of the cutter frame raises the ball guide and cutters sufficiently high for the last and last pattern to pass under them for this cutting and trimming of the upper part or surface of the toe end of the last; as shown in detail section in Fig. 9. When the last is trimmed the frames are moved back from each other as before described, the last removed and another put in its place and operated on as before. The ball guide because of its globular or spherical shape presents the best bearing and guiding surface upon the last pattern for the more perfect cutting of the last to correspond to the last pattern. The weighted arm can be so balanced that it will hold the swinging frame in either its forward or backward position, but when the cutters are in operation the frame is held firmly in its operative position by the operator holding the handle. Although there are two cutters described and shown, there need be only one, but it is preferable to have the two as they balance each other on the shaft causing it to run better. The last to be operated upon rests by its ball upon a plate $a^2$ which lies loosely on the blocks T its ends $b^2$ being bent down over the sides of the block to keep it in place and when adjusting the last on its seat to present it to the cutters the plates can be lifted from its position and pieces of sheet material, such as paper placed under it to raise it to the height desired.

Having thus described my invention, what I claim is—

1. In a last trimming machine, a holder or support for a last pattern and last to be operated upon, a support for said holder on which it is arranged to move reciprocatingly or, forward and backward, a movable frame, a guide or gage on said frame of a ball or globe shape, a revolving shaft on said movable frame and a cutter or cutters on said shaft having its cutting edge or edges in an arc of a circle to correspond to the shape or outline of the guide or gage.

2. In a last trimming machine a holder or support for a last pattern and last to be operated upon, a support for said holder on which it is arranged to move reciprocatingly or forward and backward, a swinging frame, a guide or gage on said frame of a ball or globe shape arranged to turn thereon, a revolving shaft on said swinging frame, and a cutter or cutters on said shaft having its cutting edge or edges in an arc of a circle to correspond to the shape or outline of the guide or gage.

3. In a last trimming machine, a holder or support for a last pattern and last to be operated upon, a support for said holder on which it is arranged to move reciprocatingly or forward and backward, a swinging frame pivoted to a suitable support, a guide or gage of a ball or globe shape on said pivoted frame, a revolving shaft on said swinging frame, and a cutter or cutters on said shaft having its cutting edge or edges in an arc of a circle to correspond to the shape or outline of said guide or gage.

4. In a last trimming machine, a support for holding a last pattern and last to be operated upon, adapted to be moved laterally upon a suitable support, and said latter support adapted to be moved forward and backward on a support, a movable frame carrying a guide or gage, a revolving shaft and a cutter or cutters secured thereto, having its cutting edge in an arc of a circle or semi circular form, to correspond to the shape or outline of the guide or gage.

5. In a last trimming machine, a holder or support for a last pattern and last to be operated upon, a swinging frame pivoted to a support adapted to move back and forth on a suitable support, a weighted arm secured to said swinging frame, a guide or gage on said frame, a revolving shaft on said frame, and a cutter or cutters secured to said shaft having its cutting edge or edges corresponding to the shape or outline of said guide or gage.

6. In a last trimming machine, a table or support provided with guide rails, a frame adapted to move back and forth on said rails, rods or bars on said frame at right angles to said guide rails, a support for a last pattern and last to be operated upon, adapted to slide on said rods or bars and a handle on said support for operation of the same.

7. In a last trimming machine a bar R′, a piece pivoted thereto having two angular arms, a support for said bar on which it is adapted to slide back and forth, and arranged to be secured from movement thereon.

8. In a last trimming machine, a bar R′, a piece pivoted thereto having two angular arms, and an adjusting screw in the end of each arm, a support for said bar in which it is adapted to slide back and forth and arranged to be secured from movement thereon.

In testimony whereof I have hereunto set my hand in the presence of two subscribing witnesses.

WILLIAM H. AUSTIN.

Witnesses:
W. THOMPSON,
EDWIN W. BROWN.